US007603790B2

(12) United States Patent
Jordan et al.

(10) Patent No.: US 7,603,790 B2

(45) Date of Patent: Oct. 20, 2009

(54) APPARATUS AND METHOD FOR DETERMINING WHETHER AN ENVELOPE IS IN OR OUT OF SPECIFICATION

(75) Inventors: Paul G. Jordan, Smyrna, GA (US); Kristen Matthew Getty, Deerfield, IL (US); Warren Safran, Pottstown, PA (US); Ryan Carl Weiss, Overland Park, KS (US); John Schlich, Atlanta, GA (US); Robert Elliot, Marietta, GA (US); Patrick Brown, Marietta, GA (US)

(73) Assignee: National Envelope Corporation, Uniondale, NY (US)

( * ) Notice: Subject to any disclaimer, the term of this patent is extended or adjusted under 35 U.S.C. 154(b) by 309 days.

(21) Appl. No.: 11/760,999

(22) Filed: Jun. 11, 2007

(65) Prior Publication Data

US 2008/0301964 A1 Dec. 11, 2008

(51) Int. Cl.
*G01B 3/14* (2006.01)

(52) U.S. Cl. .......................... 33/563; 33/562; 33/1 BB; D10/64; 235/495

(58) Field of Classification Search .................. 33/562, 33/1 BB, 563; 235/495; D10/64
See application file for complete search history.

(56) References Cited

U.S. PATENT DOCUMENTS 3,024 A * 3/1843 Oliver .......................... 33/2 R
D131,626 S * 3/1942 Ellwood et al. .............. D10/71
D137,459 S * 3/1944 Colmery ...................... D10/62
D157,404 S * 2/1950 Nowax ........................ D10/64
3,760,506 A * 9/1973 Tudberry ..................... 33/563
3,863,051 A * 1/1975 Wilcoxon ................... 235/495
4,422,241 A * 12/1983 Meeker ..................... 33/1 BB
4,607,433 A * 8/1986 Meeker ..................... 33/1 BB
4,993,624 A * 2/1991 Schlich ........................ 229/71
5,090,129 A * 2/1992 Cunningham ................ 33/481
5,170,570 A * 12/1992 Mays, Jr. ...................... 33/512
D349,655 S * 8/1994 Round ......................... D10/64
5,459,936 A * 10/1995 Stange ......................... 33/563
D379,155 S * 5/1997 Bond .......................... D10/64
D402,906 S * 12/1998 Sullivan ...................... D10/64
D413,276 S * 8/1999 Jacoff .......................... D10/64

* cited by examiner

*Primary Examiner*—G. Bradley Bennett
*Assistant Examiner*—Tania C Courson
(74) *Attorney, Agent, or Firm*—Baker & Hostetler LLP

(57) ABSTRACT

A measuring gauge constructed of a transparent "L" shaped body having an elongated first arm and a second shorter arm disposed at 90 degrees to the first arm and defining a notch therein which forms a triangle with the first leg of the triangle angularly disposed with respect to the outer edge of the second arm. A plurality of indicia are carried by the two legs of the gauge. The indicia each include a center band sandwiched between outer bands with the inner and outer bands being of contrasting colors. The side edges of the gauge are inserted between the flaps and back panels of the envelope into engagement with a gum line and a depth of penetration is observed by determining the intersection of an edge of the envelope with the indicium along a side edge of the gauge thereby determining whether or not the envelope is in or out of specification.

15 Claims, 5 Drawing Sheets

APPARATUS AND METHOD FOR DETERMINING WHETHER AN ENVELOPE IS IN OR OUT OF SPECIFICATION

FIELD OF THE INVENTION

The present invention relates generally to the manufacture of envelopes on a production line apparatus and more particularly to an apparatus and method to measure predetermined positions upon the envelope to determine whether the envelope is in or out of specification.

BACKGROUND OF THE INVENTION

Envelope manufacturing machines which fold the closure, side and bottom flaps or panels of envelope blanks are well known in the prior art. Such machines which manufacture such envelopes on a production line basis are also well known, including such apparatus which automatically applies adhesive or gum to predetermined portions of the envelope blank during the manufacturing process and cuts windows in the envelope blank.

While it is known to make envelopes and apply adhesives to various flaps and other portions of the envelope in a continuous production line system, if the gum is incorrectly applied to the predetermined areas of the envelope, then the envelope will not function as designed. Such will in turn negatively affect the basic use of the envelope as well as cause problems with inserting equipment and postal sorting equipment. Traditional ways to validate the correct positioning of gum and the window at predetermined points on the envelope blank have been visual inspection, holding the envelope to a template manually measuring portions of the envelope or the like. Such methods rely on an interpretation of measurement apparatus and standards and specifications and requires a multiplicity of tools and is time consuming and subject to error.

There is a need for an apparatus and process which may be utilized by an operator to more quickly and easily validate that window and the gum exist and is in the proper position and length and which is reliable.

SUMMARY OF THE INVENTION

The present invention is directed to a measuring gauge for determining that an envelope meets predetermined specifications as well as a method of manufacturing envelopes in a high-speed production line utilizing the measuring gauge.

The measuring gauge is a flat, transparent “L” shaped body including an elongated first arm forming the long side of the “L” shaped body and a second shorter arm disposed at 90° to the first arm and at one end thereof. There is provided a notch in the second arm with the notch defining a triangle with the first leg angularly disposed with respect to the outer edge of the second arm. A first indicia is carried by the first leg of the triangle for indicating an in or out of specification of a first portion of an envelope, a second indicia is carried by the outer edge of the first arm for indicating an in or out of specification of a second portion of an envelope, a third indicia is carried by the inner edge of the first arm for indicating an in or out of specification of a third portion of an envelope and a scale is carried by the outer edge of the second arm for determining in or out of specification of a window formed in said envelope.

The method of manufacturing an envelope in accordance with the present invention comprises establishing a plurality of controllable manufacturing parameters providing a measuring gauge including a triangular element, the measuring gauge having indicia disposed on side edges thereof which may be read by a user to ascertain whether various portions of an envelope are within predetermined specification, selecting envelopes during a production run for measurement to determine whether they are within said predetermined specifications, inserting a first edge of the gauge between the side flap and back panel of an envelope and into engagement with the gum line and reading the depth of penetration of the first edge of the gauge, inserting the terminus of the triangular element of the gauge between the back flap and side flap at the bottom fold line and reading the depth of penetration of the triangular element, opening the side seam fold line of the envelope to expose the side flap on the inside of the envelope and inserting a second edge of the gauge between the back panel and the inside edge of one of the side flaps into engagement with gum and reading the depth of penetration of the second edge of the gauge, and placing the outermost part or tip of the triangular element at the bottom fold of the envelope and reading the distance from the bottom fold to the bottom of the window cutout, and adjusting one or more of the parameters to correct for any out of specification readings obtained.

DETAILED DESCRIPTION

Figure 1:
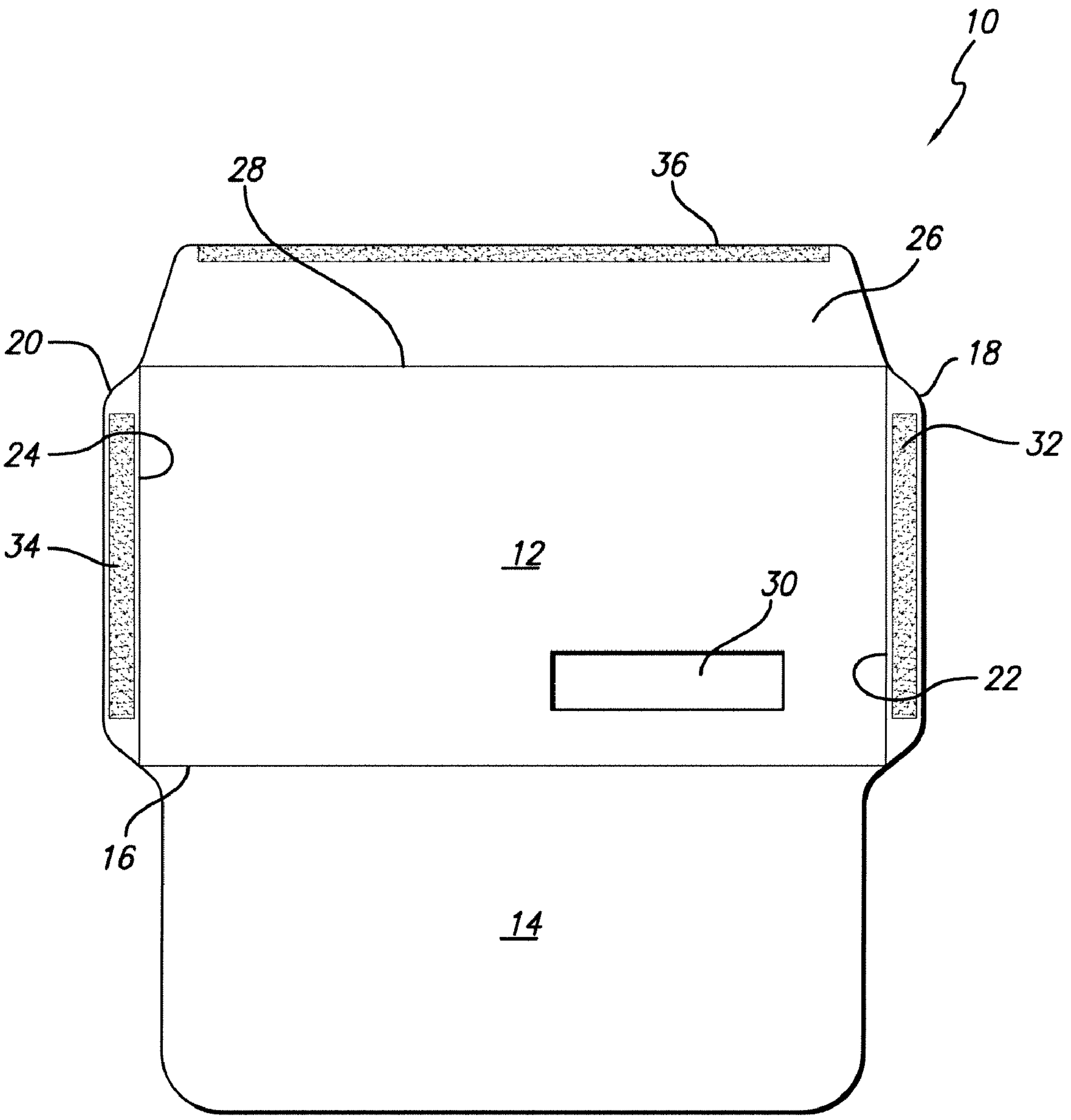
FIG. 1 PRIOR ART
FIG. 1 is a schematic representation of a blank used to form a side seam envelope.

The present invention is an improved process for manufacturing envelopes that utilizes a novel measuring gauge, and a methodology for using the gauge on samples of product at predetermined intervals. The novel measuring gauge is used manually to measure the location of the seam gum application and the address display window on an envelope. The gauge measures four different locations of seam gum, namely, top, outside, inside, and bottom. The gauge has four indices such as contrasting bands for these four measurements. The contrasting bands may be alternating bands of red and green. When the gauge is properly applied to the envelope, the red indicates the seam gum was applied to incorrect locations, and adjustments to the manufacturing parameters are needed. The green indicates that the seam gum application was in the correct region. The gauge also includes a scale along one side which is used to measure the position of the window and the size of the flap on the envelope.

Preferably, the margin of error is +/−1/16 inch, which is reflected by the green width of the bands on the gauge. The monitoring measurement is preferably taken at least once every 30 minutes. Preferably, three consecutive envelopes are taken for measurement during each sampling for consistency, although any number may be taken, and such may be done randomly. If the results show that the seam gum is applied in the correct region, then no adjustment is needed. If the results show that the seam gum is not applied in the correct region, a corrective adjustment is taken to reduce or eliminate the error.

The improved process comprises initially establishing a plurality of controllable manufacturing parameters of an envelope making apparatus, including the fold locations for side panels or flaps of an envelope, the width of adhesive application from an adhesive applicator associated with the apparatus, the length of adhesive application from the adhesive applicator, the thickness of the applied adhesive from the applicator, the initial location for application of adhesive by the applicator, the distance from the edge of a side flap to a gum or adhesive line, pressure of exit rollers from the applicator and apparatus, the speed of movement of paper stock through the apparatus, and other parameters. The process further includes providing a measuring gauge (a "Go/No-Go" Gauge") for use in measuring variations of said parameters on manufactured envelopes. The measuring gauge is preferably fabricated from Mylar, about 10 thousands of an inch thick, and is transparent, in the shape of an inverted "L", and has several predetermined human-readable indicia operative to provide a measurement of in-spec and out-of-spec tolerance for various parameters. Each of the four sides of the gauge is labeled with an appropriate name for the part of an envelope to be checked against the measurements of the gauge, namely, top, bottom, inside, and outside. The gauge has colored regions or bands that are sized to represent an in-spec measurement and warn of out-of-spec measurements, plus or minus 1/16 inch.

For one typical side seam gummed envelope, the bottom or lower leg of the "L" of the gauge is 1½ inches, while the long side or leg of the "L" is 4 inches, with a top 2½ inches wide. The dogleg or short leg of the "L," is 1 inch long by 1 inch wide, with the remainder of the gauge being 2½ inches long. These dimensions may vary depending upon the size of the envelope to be measured.

One indicium on the gauge 10 indicates "Check at least 3 samples every 30 minutes".

A first measuring indicia comprises a legend INSIDE, positioned proximate to a three-layer band along an outer edge of the "L", and extending about ⅔ of the distance from the top of the "L." The band includes a central band of 0.125 inches indicative of "in spec", positioned between two outer bands of 0.125 inches indicative of "out of spec".

A second measuring indicia comprises a legend OUTSIDE, positioned proximate to a three-layer "L" shaped band, along an inner edge of the longer leg of the "L". The second band also includes a central outer band of 0.125 inches indicative of "in spec", positioned between two-outer bands of 0.0625 & 0.125 inches indicative of "out of spec".

A third measuring indicia comprises a legend TOP, positioned proximate to a three-layer "L" shaped band:, along an inner edge of the shorter leg of the "L", and intersecting with the band of the longer leg. The third band also includes a central band of 0.125 inches indicative of "in spec", positioned between two outer bands of 0.0625 & 0.125 inches indicative of "out of spec".

A fourth measuring indicia comprises a legend BOTTOM, positioned proximate to a two-region triangular element, having an apex generally aligned with the edge of the shorter leg of the "L", and having a triangular notch defined along the edge of the shorter leg of the "L" of the gauge. Along the hypotenuse edge of the triangle, the three-region colored element includes an inner or central band which is preferable a green portion and an outer band which is a preferable red portion on either side and extending to the apex. Measuring from the outside vertical edge and along the hypotenuse edge, the red portion is 0.9375 inches indicative of "out of spec", the inner green portion is 0.350 inches indicative of "in spec", and the second red portion is 0.30 inches and indicative of "out of spec".

A fifth measuring indicia includes a scale along the bottom of the shorter leg of "L" to measure the location of the address display window.

A user of the gauge uses the gauge preferably on three consecutive envelopes to ensure that clearances are within spec. If the gauge shows that the gum or adhesive line is within spec on the three consecutive envelopes, no adjustments are indicated.

All specs—top, bottom, outside, and inside clearance and window location—are checked preferably at a maximum interval of 30 minutes, during normal quality control inspections. Preferably, at least three sequential envelopes are checked before any settings are adjusted.

By way of illustration a side seam envelope upon which the apparatus and method of the present invention may be used is found in FIG. 1 which is prior art and is well known to the industry. As is shown an envelope blank 10 is provided from which the envelope is manufactured. As is shown the envelope blank 10 includes a front panel 12, a back panel 14 joined to the front panel by a bottom or intermediate fold line 16. Side flaps 18 and 20 are joined to the front panel by side fold lines 22 and 24 respectively. A closure flap 26 is joined to the front panel 12 by a fold line 28. An address display window 30 is formed in the front panel 12 and is usually covered by a transparent layer of material such as plastic. To secure the envelope together in its completed form a layer of adhesive is applied to the opposite side (from that illustrated in FIG. 1) of the side flaps 18 and 20 as is illustrated by the dotted lines 32 and 34 respectively on the side flaps 18 and 20. That is, when the side flaps 18 and 20 are folded along their fold lines 22 and 24 to lie over the front panel 12, the adhesive 32 and 34 will be present so that when the back panel 14 is folded along the bottom fold line 16 over the front panel 12 the back panel 14 will be secured by the adhesive 32 and 34 to the side flaps 18 and 20 thus completing the envelope and providing an inner pocket for receipt of desired materials. The closing flap 26 also has a layer of adhesive 36 which is typically remoistenable adhesive so that the user may apply liquid to the adhesive 36 and secure the closure flap 26 to the outside of the back panel 14. Typically the adhesive layers 32 and 34 are hot melt adhesive applied during the manufacturing process in a high speed production apparatus. As above pointed out, if the adhesive layers or gum lines 32 and 34 are not properly applied, the envelope may not function as designed. As a result the measuring gauge of the present intention is utilized to be capable of quickly and easily measuring various portions of the envelope in its completed form to determine whether or not the envelope meets the desired specifications.

Figure 2:
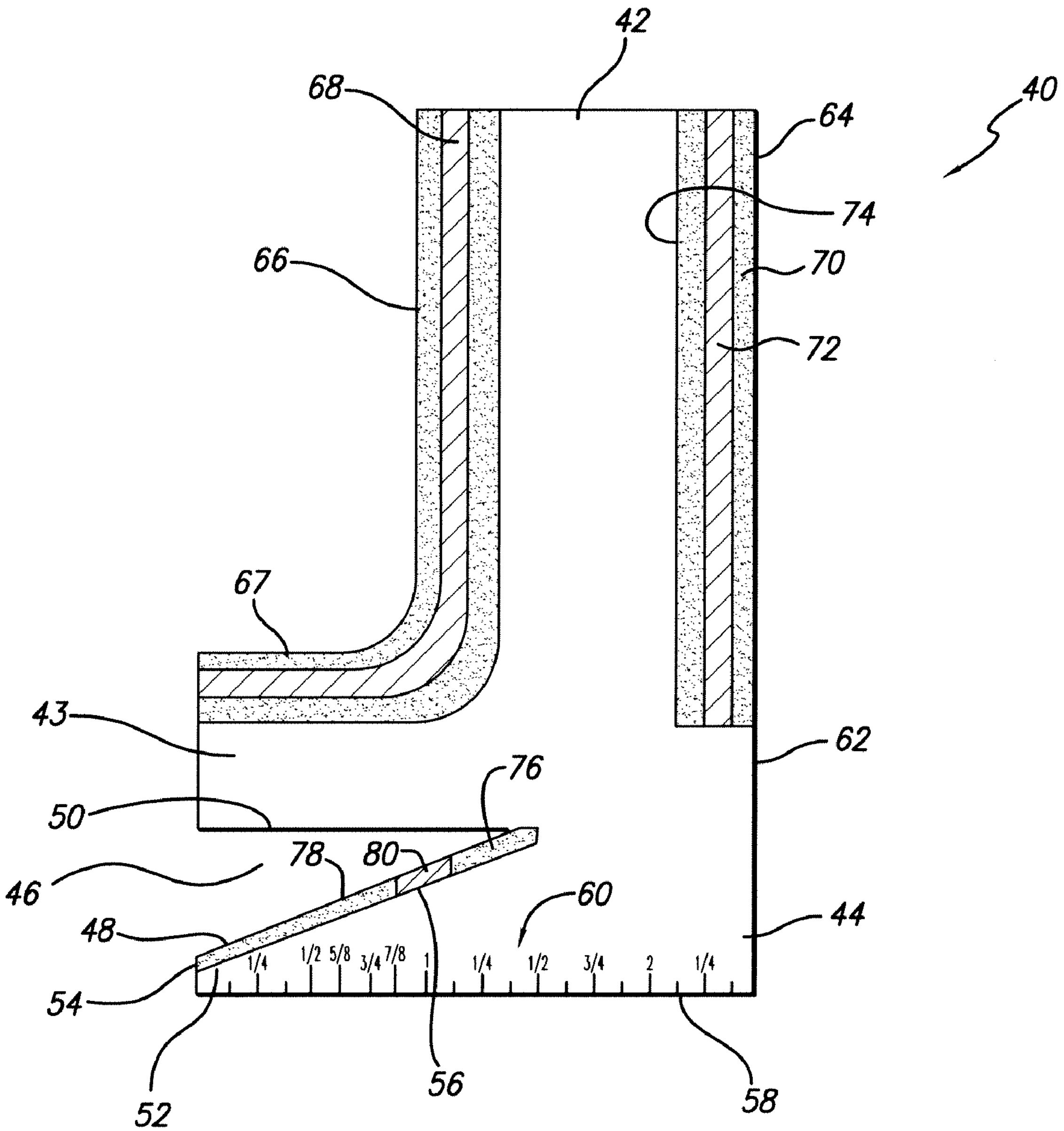
FIG. 2 is a top plan view of a measuring gauge constructed in accordance with the principles of the present invention.

Such a measuring gauge 40 is shown in FIG. 2. The measuring gauge 40 is manufactured from a thin transparent material typically plastic such as Mylar having a thickness of approximately 0.0010 inches and is constructed in the form of an "L" shaped device. Measuring gauge 40 has a first elongated leg or arm 42 which provides the long side or leg of the L and second shorter arm or leg 43 which is disposed at 90 degrees to the leg 42 and at the end 44 thereof. The short leg 43 defines a triangular notch 46 having a hypotenuse 48 and a leg 50. The notch generates a triangular element 52 at the bottom of the arm 43 which has a terminus 54. Along the hypotenuse 48 there is provided an indicium 56 which may be used to ascertain whether or not a particular portion of the envelope is within desired specifications and such will be described further particularly in conjunction with FIG. 3. Along the lower portion 58 of the arm 43 there is provided a scale 60 which may be utilized to measure distance from the terminus 54 to ascertain whether or not another portion of the envelope is within appropriate specifications and such will be described more fully in conjunction with FIGS. 6 and 7.

Along a first edge 62 of the elongated arm 42 of the gauge 40 there is provided an indicium 64 which is utilized to ascertain whether or not another portion of the envelope is within specification and such will be described more fully in conjunction with FIG. 5 below. On the opposite side 66 of the arm 42 there is provided an indicium 68 which may be utilized to determine whether or not another portion of the envelope meets specification and this will be described more fully in conjunction with FIG. 4 below. The indicia 64 and 68 preferably take the form of contrasting bands such as shown at 70, 72 and 74 of the indicium 64. For example, in one preferred embodiment, the bands 70 and 74 may be of a particular color such as red while the band 72 may be of a contrasting color such as green. Alternatively, the bands 70 and 74 may, for example, be black with the center section or band 72 being white or transparent. Obviously, any system utilizing contrasting bands irrespective of color may be utilized in accordance with the preferred embodiment of the present invention. When the envelope meets the desire specifications the intermediate band such as that shown at 72 will be readily apparent to the user of the gauge 40 whereas if the bands 70 or 74 appear in a particular measurement the envelope is considered out of specification.

A similar contrasting arrangement is used for the indicium 56 as is illustrated along the hypotenuse 48. The indicium 56 contains first and second bands 76 and 78 which sandwich a contrasting band 80, there between. As indicated above, when the band 80 appears during the utilization of the gauge to measure a particular portion of the envelope that portion of the envelope is within specification. If either band 76 or 78 appear then that portion of the envelope is out of specification.

Additional indicia also appear on the gauge 40 such as the legends top, bottom, inside and outside. These refer to various portions of the envelope that are to be measured by that part of the gauge. These indicia guide the user of the gauge 40 as to where that particular portion of the gauge is to be placed for a specific measurement. It should also be noted that there appears on the gauge the additional legend “check at least three samples every 30 minutes”. This is a reminder to the user of the gauge that at least three envelopes are to be secured from the production run taking place every 30 minutes and these three envelopes are to be measured to determine whether or not the production run is generating envelopes which meet the desired specifications.

Figure 3:
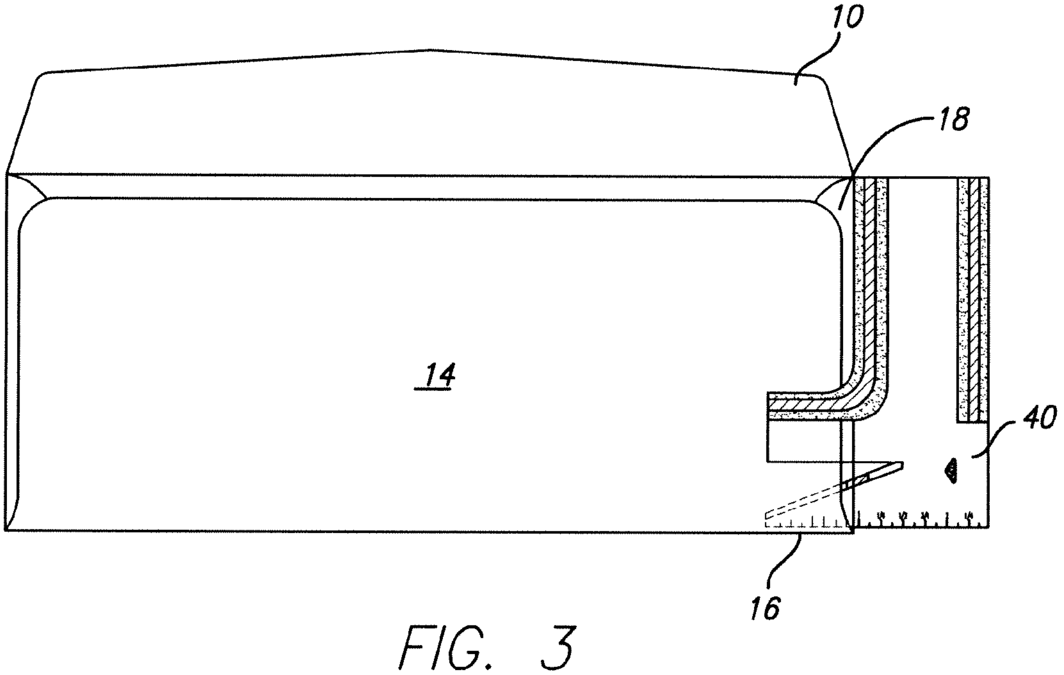
FIG. 3 shows the gauge of FIG. 2 being used to measure the bottom of the envelope.

FIG. 3 illustrates the gauge 40 being used to measure the bottom of the envelope. In order to accomplish this measurement the terminus 54 of the triangular element 52 is inserted along the bottom fold 16 of the envelope 10 between the back panel 14 and the side flap 18 until the top or hypotenuse 46 of the triangular element comes into contact of the line of adhesive securing the back panel 14 to the side flap 18. When such occurs, the user of the gauge 40 will read the position of the indicium 56. If the band portion 80 is intersected by the edge of the back panel 14 this portion of the envelope is considered within specification. If however, either of the other contrasting portions 76 or 78 of the indicium 56 are intersected by the edge of the back panel 14 that portion of the envelope is considered out of specification and an adjustment of the manufacturing apparatus to properly apply the adhesive layer 32 must be made.

Figure 4:
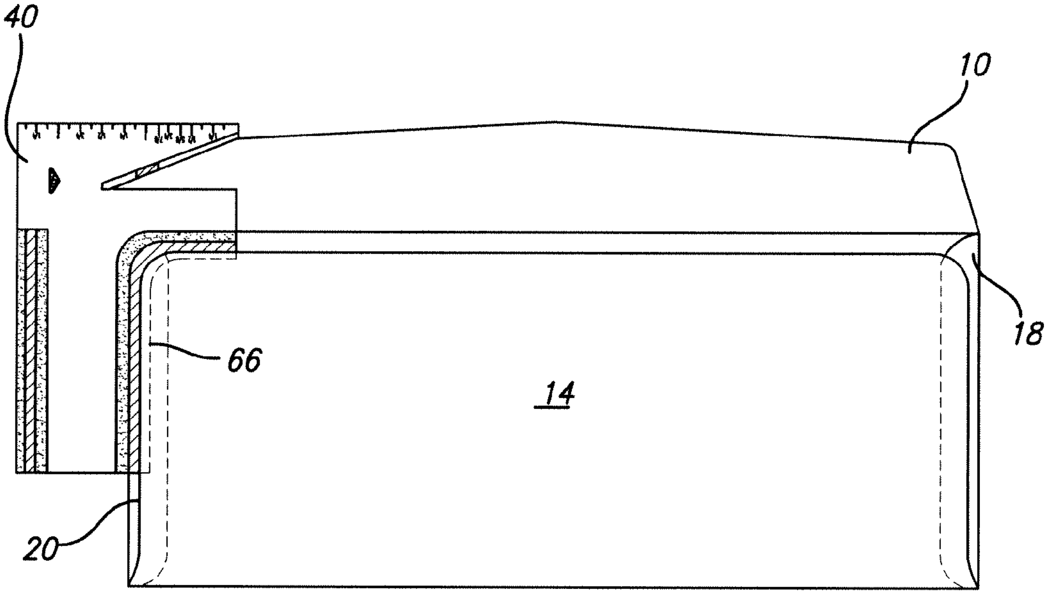
FIG. 4 illustrates the gauge of FIG. 2 being used to measure the top and outside edge of the envelope.
Figure 5:
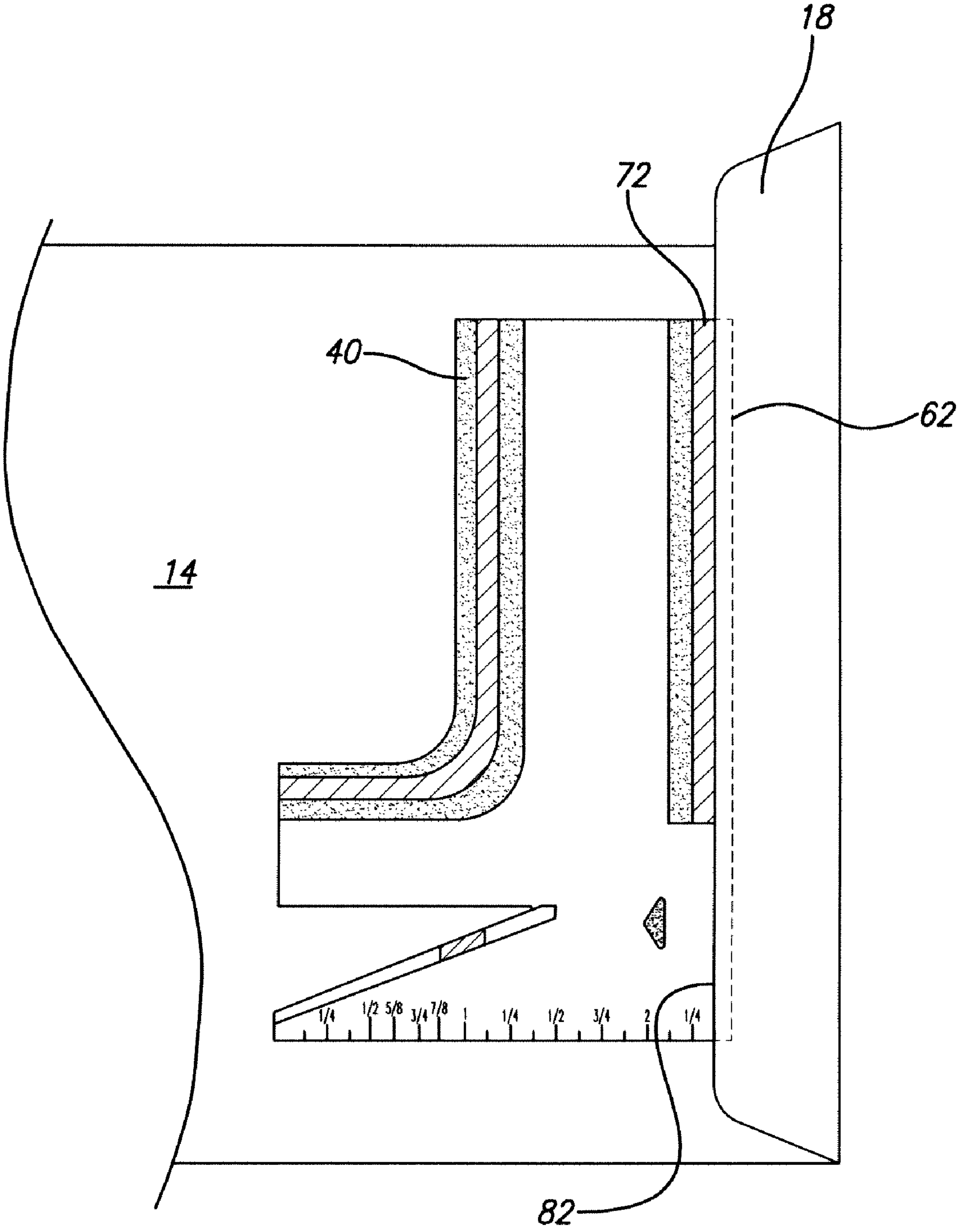
FIG. 5 shows the gauge of FIG. 2 being used to measure the inside edge of the envelope.

FIG. 4 illustrates the measuring gauge 40 being utilized to measure the outside of the envelope 10. As is shown the edge 66 of the gauge is inserted between the back panel 14 and the side flap 20 until the edge 66 encounters the adhesive line which secures the back panel 14 to the side flap 20. The operator then observes the indicium along the edge 66 to determine whether or not the inner band portion 68 is intersected by the edge of the back panel 14. If such occurs then that portion of the envelope is within specification and no action needs to be taken. If however, either of the outer contrasting bands which are positioned on opposite sides of the inner band 68 are intersected by the edge of the back panel 14 the envelope is considered out of specification and appropriate adjustments of the adhesive applying apparatus or other portions of the manufacturing apparatus must be made accordingly. It should be apparent to those skilled in the art that the gauge 40 may be applied in a similar manner between the opposite side of the back panel 14 and the side flap 18 by turning the gauge 40 over from that shown in FIG. 4 and inserting it in a like manner. In addition, the edge 67 of gauge 40 is inserted at the top of the panel 14 and moved downwardly until the adhesive line is engaged. The position of the top edge of the panel 14 is observed, and if it intersects the inner band 68, then the length of the adhesive line is correct.

It is also desirable to check the inside of the envelope to determine whether or not the adhesive line on the side flaps 18 and 20 is positioned properly. This can be accomplished by utilizing the gauge 40 in the manner shown in FIG. 5. To accomplish this the side edges along the fold lines 22 and 24 for the side flaps are slit carefully so as not to destroy the side flaps 18 and 20. The envelope is then opened so that it appears substantially as a blank as shown in FIG. 1 but with the side flaps attached to the back panel 14. The portion of the gauge marked inside is then inserted between the side flap 18 and the back panel 14 until the edge 62 thereof engages the adhesive line which secures the side flap 18 to the back panel 14. If the center portion 72 of the contrasting bands is intersected by the edge 82 of the side flap 18 then the envelope is within specification. If either of the bands 70 or 74 are intersected by the side edge 82 then this portion of the envelope is out of specification and the manufacturing apparatus must be adjusted accordingly.

Figure 6:
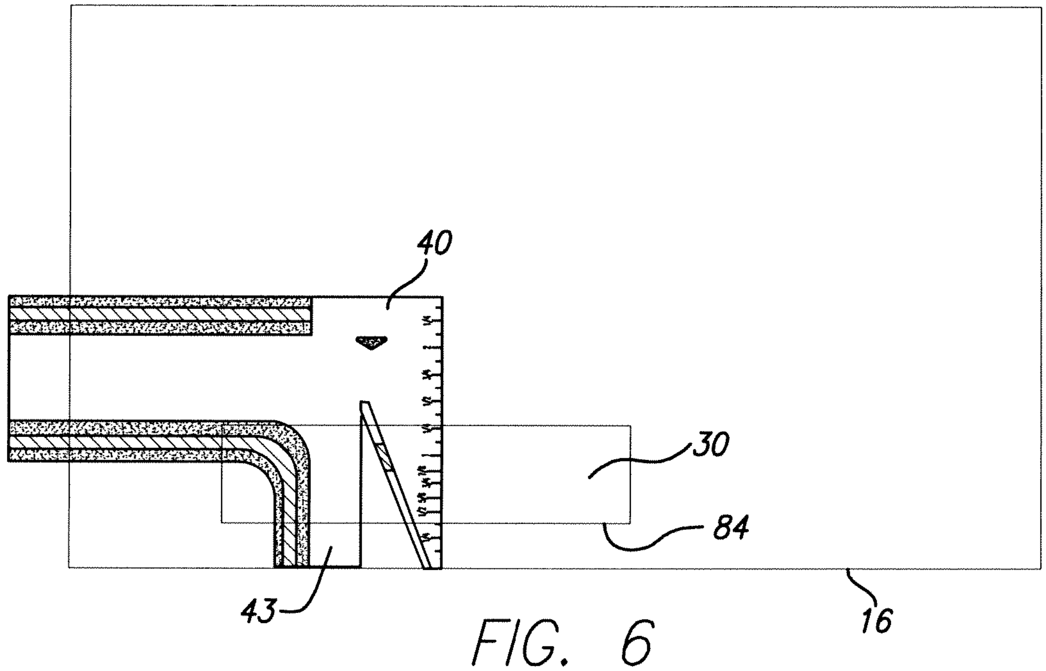
FIG. 6 shows the gauge of FIG. 2 being used to measure the window position relative to the bottom of the envelope.
Figure 7:
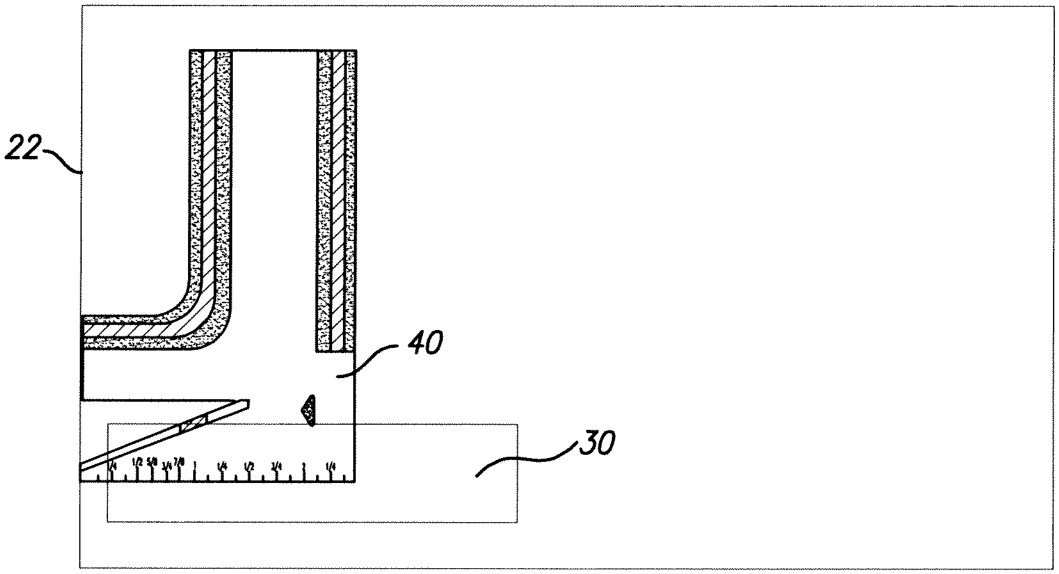
FIG. 7 shows the gauge of FIG. 2 being used to measure the window position relative to a side fold of the envelope.

As shown in FIGS. 6 and 7 the gauge 40 may be utilized to measure the position of the address display window 30 with respect to the envelope. As shown in FIG. 6 the outer edge or terminus 54 of the triangular element 52 is positioned along the lower fold line 16 of the envelope and the scale 60 is read to determine how far the bottom 84 of the window 30 is from the fold line 16. As is indicated particularly in FIG. 2 the readings ½ and ⅝ and ⅞ are predominantly displayed on the scale. These measurements from the terminus 54 are standard in the industry for the proper positioning of the bottom of the window 30 from the fold line 16. In a similar manner the position of the address display window 30 from the left edge of the envelope could be measured as is illustrated in FIG. 7. This is accomplished by placing the terminus 54 of the arm 43 against the left side of the envelope as illustrated and then measuring, using the scale 60, the distance from the left edge or fold line 22 to the edge of the window 30. Again the designations ½, ⅝ and ⅞ are standard for most side seam envelopes.

There has thus been described a measuring gauge and the method of using the same to measure various portions of an envelope to determine whether or not they are within specifications determined by the manufacturing parameters of an envelope manufacturing apparatus. It should be evident to those skilled in the art, that a single tool, the gauge, is used by the operator or to measure several portions of the envelope. This can be done quickly and easily and provides a reliable indication on a go/no go basis as to the in or out of specification status of a production run of envelopes. If the measurements illustrate that the portions of the envelope or any of them which are measured do not fall within the desired specifications as initially generated then the controllable parameters of the manufacturing apparatus are adjusted to bring the envelopes being manufactured within the specifications desired. As is indicated, this may require adjusting the fold locations for the side flaps, the width of the strip of adhesive which is being applied, the start or stop point of the strip of adhesive, the length of the adhesive, the distance from the edge of a side flap to the line of adhesive or the like to bring the envelope within the desired set of specifications.

While the fundamental novel features of the invention have been shown and described in accordance with the above-preferred embodiments thereof, it should be understood that various substitutions, modifications and variations made by made by those skilled in the art without departing from the spirit or scope of the invention. Accordingly, all such modifications or variations are included in the scope of the invention as defined by the claims.

What is claimed is:

1. A measuring gauge for determining that a side seam envelope meets predetermined specifications comprising:

(a) a flat transparent "L" shaped body including an elongated first arm forming the long side of the "L" shaped body and a second shorter arm disposed at ninety degrees to said first arm and at one end thereof;

(b) a notch in said second arm defining a triangle with a first leg angularly disposed with respect to the outer edge of said second arm;

(c) a first indicia carried by said first leg for indicating an in or out of specification of a first portion of an envelope;

(d) a second indicia carried by the outer edge of said first arm for indicating an in or out of specification of a second portion of an envelope;

(e) a third indicia carried by the inner edge of said first arm for indicating an in or out of specification of a third portion of an envelope; and (f) a scale carried by the outer edge of said second arm for determining in or out of specification of a window cut out in said envelope.

2. A measuring gauge as defined in claim 1 wherein said indicia include contrasting bands.

3. A measuring gauge as defined in claim 2 wherein said contrasting banks include a band of one color sandwiched between bands of a different color.

4. A measuring gauge as defined in claim 3 wherein said band of one color is green and said bands of a different color are red.

5. A measuring gauge as defined in claim 1 wherein said scale is divided into ⅛ inch increments with the ½, ⅝ and ⅞ inch increments emphasized.

6. A measuring gauge as defined in claim 1 wherein said third indicia extends along an edge of said shorter arm which intersects said first arm and said extension is used for indicating an in or out of specification for a fourth portion of said envelope.

7. A measuring gauge as defined in claim 6 which further includes the indicium "TOP" adjacent said extension.

8. A measuring gauge as defined in claim 1 which further includes the indicium "INSIDE" adjacent said second indicia.

9. A measuring gauge as defined in claim 1 which further includes the indicium "OUTSIDE" adjacent said third indicia.

10. A measuring gauge as defined in claim 1 which further includes the indicium "BOTTOM" adjacent said first indicia.

11. The method of manufacturing envelopes in a high speed production line, said envelopes having a back flap and a front flap joined at a bottom fold, and first and second side flaps joined to said back flap at first and second side folds, an adhesive material securing said back flap to said side flaps and an address displaying window cut out, said method comprising:

(a) establishing a plurality of controllable manufacturing parameters;

(b) providing a measuring gauge, including a triangular element, the measuring gauge having indicia disposed along side edges thereof which may be read by a user to ascertain whether a portion of an envelope is within predetermined specifications;

(c) selecting envelopes during a production run for measurement to determine whether they are within said predetermined specification;

(d) inserting a first edge of the gauge between the side flap and back flap and into engagement with the adhesive and reading the depth of penetration of the first edge of the gauge;

(e) inserting the terminus of the triangular element of the gauge between the back flap and side flap at the bottom fold and into engagement with said adhesive material and reading the depth of penetration of the triangular element;

(f) opening a side seam fold of the envelope to expose the side flap on the inside of the envelope, inserting a second edge of the gauge between the back flap and the inside edge of one of the side flaps into engagement with the adhesive and reading the depth of penetration of the second edge of the gauge;

(g) 1. placing the terminus of the triangular element at the bottom fold of the envelope and reading the distance from the bottom fold to the bottom of the window cut out of the envelope;

2. placing the terminus of the triangular element at the first side fold of the envelope and reading the distance from the first side fold to the left side of the window cut out of the envelope; and (h) adjusting one or more of said parameters to correct for any out of specification readings.

12. The method of manufacturing envelopes as defined in claim 11 wherein said indicia includes contrasting bands and the depth of penetration of said gauge is determined by the presence or absence of at least one of said bands.

13. The method of manufacturing envelopes as defined in claim 12 wherein said contrasting bands include a band of one color sandwiched between bands of a different color and when an edge of said back flap intersects said band of one color of said indicia disposed along said first edge of said gauge, said envelope portion is within specification.

14. The method of manufacturing envelopes as defined in claim 12 wherein said contrasting bands include a band of one color sandwiched between bands of a different color and when an edge of said back flap intersects said band of one color of said indicia disposed along said edge of said triangular element.

15. The method of manufacturing envelopes as defined in claim 12 wherein said contrasting bands include a band of one color sandwiched between bands of a different color and when an edge of said side flap intersects said band of one color of said indicia disposed along said second edge of said gauge, said envelope portion is within specification.

* * * * *